United States Patent
Yamakita

(10) Patent No.: US 8,564,787 B2
(45) Date of Patent: Oct. 22, 2013

(54) OCT APPARATUS AND INTERFERENCE SIGNAL LEVEL CONTROL METHOD FOR THE SAME

(75) Inventor: Hiroshi Yamakita, Ashigarakami-gun (JP)

(73) Assignee: Carl Zeiss Meditec, Inc., Dublin, CA (US)

( * ) Notice: Subject to any disclaimer, the term of this patent is extended or adjusted under 35 U.S.C. 154(b) by 556 days.

(21) Appl. No.: 12/797,352

(22) Filed: Jun. 9, 2010

(65) Prior Publication Data

US 2010/0315649 A1    Dec. 16, 2010

(30) Foreign Application Priority Data

Jun. 10, 2009 (JP) .................................. 2009-139322

(51) Int. Cl.
*G01B 9/02* (2006.01)
(52) U.S. Cl.
USPC ........................................................ 356/479
(58) Field of Classification Search
USPC ................ 356/479, 497; 250/227.19, 227.27; 600/476
See application file for complete search history.

(56) References Cited

U.S. PATENT DOCUMENTS

| | | | |
|---|---|---|---|
| 6,252,666 B1 * | 6/2001 | Mandella et al. | 356/479 |
| 6,515,276 B2 * | 2/2003 | Baney et al. | 250/227.19 |
| 7,365,858 B2 * | 4/2008 | Fang-Yen et al. | 356/489 |
| 7,486,405 B2 * | 2/2009 | Hogan | 356/497 |
| 2008/0117427 A1 | 5/2008 | Teramura et al. | |
| 2008/0175465 A1 * | 7/2008 | Jiang et al. | 382/131 |

FOREIGN PATENT DOCUMENTS

| | | |
|---|---|---|
| JP | 11119106 A | 4/1999 |
| JP | 2003028791 A | 1/2003 |
| JP | 2006-192059 A | 7/2006 |
| JP | 2008-128708 A | 6/2008 |

OTHER PUBLICATIONS

Notification of Reasons for Rejection, dated Apr. 3, 2013, issued in corresponding JP Application No. 2009-139322, 6 pages in English and Japanese.

* cited by examiner

*Primary Examiner* — Michael A Lyons
(74) *Attorney, Agent, or Firm* — Morrison & Foerster LLP

(57) ABSTRACT

An OCT measurement apparatus includes a level detection section which detects the signal level of a piece of signal intensity information in interference information outputted from an interference beam detection section, a variable optical attenuator (VOA) which adjusts the light quantity of a return beam of a reference beam, and a light quantity control section which controls the VOA on the basis of the signal level of the piece of signal intensity information in the interference information detected by the level detection section. Accordingly, an interference signal at an appropriate level can be detected without saturation of the interference signal and reduction of an S/N ratio, and optical structure information of an object to be measured can be generated using the interference signal.

11 Claims, 11 Drawing Sheets

OCT APPARATUS AND INTERFERENCE SIGNAL LEVEL CONTROL METHOD FOR THE SAME

BACKGROUND OF THE INVENTION

1. Field of the Invention

The presently disclosed subject matter relates to an OCT apparatus and an interference signal level control method for the OCT apparatus and, more particularly, to an OCT apparatus which detects an interference signal from an object to be measured at an appropriate level and generates optical structure information and an interference signal level control method for the OCT apparatus.

2. Description of the Related Art

Optical tomographic image acquisition apparatuses which utilize OCT (Optical Coherence Tomography) measurement are conventionally used to acquire an optical tomographic image of a living tissue. Such an optical tomographic image acquisition apparatus splits low coherent light emitted from a light source into a measuring beam and a reference beam and then multiplexes a reflected beam or a backscattered beam from an object to be measured obtained when the measuring beam is applied to the object to be measured with the reference beam. The optical tomographic image acquisition apparatus acquires an optical tomographic image on the basis of the intensity of an interference beam generated from the reflected beam and the reference beam (Japanese Patent Application Laid-Open No. 2008-128708). Hereinafter, a reflected beam and a backscattered beam from an object to be measured will be collectively referred to as reflected beams.

OCT measurement described above is roughly divided into two types: TD-OCT (Time Domain OCT) measurement and FD-OCT (Fourier Domain OCT) measurement. TD-OCT measurement is a method for acquiring a reflected beam intensity distribution corresponding to a position in a depth direction (hereinafter referred to as a depth position) of an object to be measured by measuring the intensity of an interference beam while changing the beam path length of a reference beam.

In contrast, FD-OCT measurement is a method for acquiring a reflected beam intensity distribution corresponding to a depth position by measuring the intensity of an interference beam for each spectral component of the beam without changing the beam path lengths of a reference beam and a signal beam and performing frequency analysis, typically a Fourier transform, on obtained spectral interference intensity signals using a computer. Since FD-OCT measurement does not require mechanical scanning used in TD-OCT measurement, it has recently been drawing attention as a method which allows high-speed measurement.

Typical arrangements for FD-OCT measurement include two types: an SD-OCT (Spectral Domain OCT) apparatus and an SS-OCT (Swept Source OCT) apparatus. An SD-OCT apparatus uses, as a light source, low coherent light such as an SLD (Super Luminescence Diode), an ASE (Amplified Spontaneous Emission) light source, a light source using broadband, and white light. The SD-OCT apparatus splits broadband, the low-coherent light into a measuring beam and a reference beam using a Michelson type interferometer or the like, applies the measuring beam to an object to be measured, causes a reflected beam from the object to be measured and the reference beam to interfere with each other, and decompose a resulting interference beam into frequency components using a spectrometer. The SD-OCT apparatus measures interference beam intensity for each frequency component using a detector array in which elements such as photodiodes are arranged in an array, acquires optical tomographic structure information of the object to be measured by performing a Fourier transform on each obtained spectral interference intensity signal using a computer, and forms an optical tomographic image from the optical tomographic structure information.

In contrast, an SS-OCT apparatus uses, as a light source, a laser whose optical frequency is swept in time. The SS-OCT apparatus causes a reflected beam and a reference beam to interfere with each other at each wavelength, measures time waveforms of signals corresponding to time variations in optical frequency, acquires optical tomographic structure information of an object to be measured by performing a Fourier transform on each obtained spectral interference intensity signal using a computer, and forms an optical tomographic image from the optical tomographic structure information.

OCT measurement is a method for acquiring an optical tomographic image of a specific region, as described above. In the case of endoscopes, for example, a cancerous lesion is detected by observation using a normal illumination light endoscope or a special light endoscope, and OCT measurement is performed on the region. This enables to determine to what extent the cancerous lesion has infiltrated. Additionally, two-dimensional scanning of the optical axis of a measuring beam allows to acquire three-dimensional information using depth information obtained through OCT measurement.

Since a fusion of OCT measurement and 3D computer graphics technology makes it possible to display a three-dimensional structure model with a resolution on the order of micrometers, a three-dimensional structure model obtained through OCT measurement will be referred to as an optical three-dimensional structure image (or optical three-dimensional structure information) hereinafter.

Automatization of OCT measurement is performed in various manners in conventional OCT measurement apparatuses. For example, a technique for automatically adjusting a beam path length in OCT measurement to cope with even a case where an object to be measured is separate by ultrasonically measuring the object to be measured is disclosed (Japanese Patent Application Laid-Open No. 2006-192059).

SUMMARY OF THE INVENTION

However, as to an interference signal outputted in OCT measurement, since the light quantity of a laser light source is small, automatic adjustment of the light quantity is not performed in the conventional art. For this reason, if an object to be measured in has a metal treatment tool such as a stent therein or if the object to be measured has high reflection intensity, an output signal from a detector which detects an interference signal may be saturated. Setting an initial value for the light quantity of a laser light source (i.e., the light quantities of a measuring beam and a reference beam and the like) to be small in order to prevent saturation may cause problems such as a reduction in the S/N ratio of an interference signal detected by a detector and a reduction in invasion depth of a measuring beam into the object to be measured by.

The presently disclosed subject matter has been made in consideration of the above-described circumstances, and has as its object to provide an OCT apparatus and an interference signal level control method for the OCT apparatus which can detect an interference signal at an appropriate level without saturation of interference signals and reduction in an S/N ratio, and generate optical structure information of an object to be measured.

In order to achieve the above-described object, an OCT apparatus according to a first aspect of the presently disclosed subject matter, comprises: a demultiplexing device which demultiplexes a low interference beam into a measuring beam and a reference beam; an irradiation device which applies the measuring beam to an object to be measured in a depth direction; a detecting device which detects an interference signal generated from a return beam of the measuring beam from the object to be measured and the reference beam; a structure information generation device which generates optical structure information of the object to be measured on the basis of the interference signal; a return beam information detection device which detects return beam information on the return beam; and an interference signal level control device which controls a signal level of the interference signal to be within a predetermined level range on the basis of the return beam information.

The OCT apparatus according to the first aspect detects the return beam information on the return beam by the return beam information detection device and controls the signal level of the interference signal to be within the predetermined level range on the basis of the return beam information by the interference signal level control device. Thus, the OCT apparatus can detect an interference signal at an appropriate level without saturating interference signals and reducing an S/N ratio and generate optical structure information of an object to be measured.

According to a second aspect of the presently disclosed subject matter, in the OCT apparatus according to the first aspect, the return beam information detection device preferably detects a light quantity level of the return beam as the return beam information.

According to a third aspect of the presently disclosed subject matter, in the OCT apparatus according to the first aspect, the return beam information detection device preferably detects the signal level of the interference signal as the return beam information.

According to a fourth aspect of the presently disclosed subject matter, in the OCT apparatus according to any one of the first to third aspects, it is preferable that: the interference signal level control device includes a reference beam light quantity adjustment device which adjusts a light quantity of the reference beam; and the interference signal level control device controls the signal level of the interference signal to be within the predetermined level range by adjusting the light quantity of the reference beam on the basis of the return beam information.

According to a fifth aspect of the presently disclosed subject matter, in the OCT apparatus according to any one of the first to third aspects, preferably, the interference signal level control device includes: a reference beam light quantity adjustment device which adjusts a light quantity of the reference beam; a return beam light quantity adjustment device which adjusts a light quantity of the return beam; and an optical information comparison device which compares the return beam information detected by the return beam information detection device with predetermined reference beam information. Further, the interference signal level control device brings a light quantity ratio between the reference beam and the return beam close to almost 1:1 by adjusting the light quantity of one of the reference beam and the return beam, on the basis of a comparison result from the optical information comparison device using one of the reference beam light quantity adjustment device and the return beam light quantity adjustment device, and controls the signal level of the interference signal to be within the predetermined level range.

According to a sixth aspect of the presently disclosed subject matter, in the OCT apparatus according to the fifth aspect, it is preferable that: the predetermined reference beam information includes a predetermined light quantity of the reference beam; the return beam information detected by the return beam information detection device includes the light quantity of the return beam; and the interference signal level control device compares the light quantity of the return beam with the predetermined light quantity of the reference beam, attenuates one of the reference beam and the return beam, the one which has larger light quantity, using one of the reference beam light quantity adjustment device and the return beam light quantity adjustment device, and brings a light quantity ratio between the reference beam and the return beam close to almost 1:1.

According to a seventh aspect of the presently disclosed subject matter, in the OCT apparatus according to any one of the first to third aspects, it is preferable that: the interference signal level control device comprises a return beam light quantity adjustment device which adjusts a light quantity of the return beam; and the interference signal level control device controls the signal level of the interference signal to be within the predetermined level range by adjusting the light quantity of the return beam on the basis of the return beam information.

According to an eighth aspect of the presently disclosed subject matter, in the OCT apparatus according to any one of the first to third aspects, it is preferable that: the interference signal level control device comprises a low interference beam light quantity adjustment device which adjusts a light quantity of the low interference beam; and the interference signal level control device controls the signal level of the interference signal to be within the predetermined level range by adjusting the light quantity of the low interference beam on the basis of the return beam information.

According to a ninth aspect of the presently disclosed subject matter, the OCT apparatus according to any one of the first to eighth aspects, preferably further comprises: a measuring beam scanning device which scans the measuring beam along a scan plane which includes a depth direction of the object to be measured; and an optical structure tomographic image construction device which constructs an optical structure tomographic image of the object to be measured from the optical structure information.

According to a tenth aspect of the presently disclosed subject matter, the OCT apparatus according to the ninth aspect, preferably further comprises: a scan plane scanning device which scans the scan plane in a direction almost orthogonal to the scan plane; and an optical three-dimensional structure image construction device which constructs an optical three-dimensional structure image of the object to be measured from the optical structure information.

An interference signal level control method for an OCT apparatus according to an eleventh aspect of the presently disclosed subject matter, comprising the steps of: demultiplexing a low interference beam into a measuring beam and a reference beam; applying the measuring beam to an object to be measured in a depth direction; detecting an interference signal generated from a return beam of the measuring beam from the object to be measured and the reference beam; generating optical structure information of the object to be measured on the basis of the interference signal; detecting return beam information on the return beam; and controlling a signal level of the interference signal to be within a predetermined level range on the basis of the return beam information.

In the interference signal level control method for the OCT apparatus according to the eleventh aspect, the return beam information on the return beam is detected in the return beam information detection step and the signal level of the interference signal is controlled to be within the predetermined level range on the basis of the return beam information in the interference signal level control step. Thus, the interference signal level control method enables to detect an interference signal at an appropriate level without saturation of interference signal and reduction of an S/N ratio, and to generate optical structure information of an object to be measured using the interference signal at the appropriate level.

As described above, the presently disclosed subject matter enables to detect an interference signal at an appropriate level without saturation of the interference signal and reduction of an S/N ratio, and to generate optical structure information of an object to be measured using the interference signal at the appropriate level.

DETAILED DESCRIPTION OF THE PREFERRED EMBODIMENTS

An embodiment of an OCT measurement apparatus as an OCT apparatus according to the presently disclosed subject matter will be described in detail below with reference to the accompanying drawings.

Figure 1:
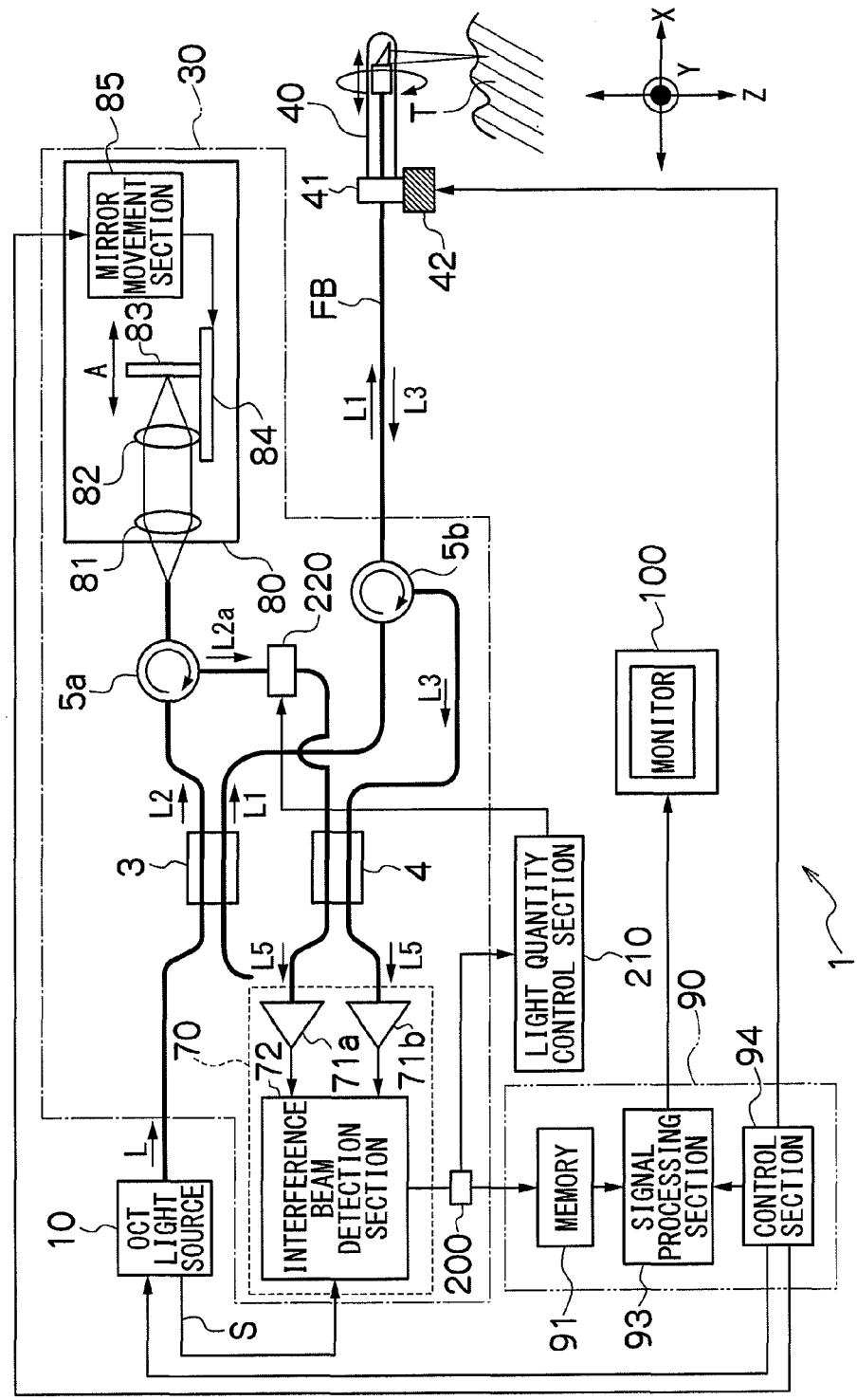
FIG. 1 is a block diagram showing a configuration of an OCT measurement apparatus according to an embodiment of the presently disclosed subject matter.

FIG. 1 is a block diagram showing a configuration of an OCT measurement apparatus according to an embodiment of the presently disclosed subject matter. As shown in FIG. 1, an OCT measurement apparatus 1 which is an OCT apparatus is configured to acquire a tomographic image of an object to be measured, such as a living tissue or a cell in a body cavity, by SS-OCT measurement with wavelengths centered around, e.g., 1.3 μm and includes an OCT light source 10, an OCT interferometer 30 having an interference information detection section 70, a probe 40, a tomographic image generation section 90, and a monitor 100.

The OCT light source 10 is a light source which emits a laser beam L in the infrared region while periodically sweeping the frequency of the beam.

The laser beam L emitted from the OCT light source 10 is demultiplexed into a measuring beam L1 and a reference beam L2 by an optical demultiplexing section 3 in the OCT interferometer 30. The optical demultiplexing section 3 is composed of (includes), e.g., an optical coupler with a splitting ratio of 90:10 and demultiplexes the laser beam L in a manner that the ratio between a measuring light and a reference light is 90:10.

In the OCT interferometer 30, a beam path length adjustment section 80, which serves as a reference beam adjustment device, adjusts a beam path length of the reference beam L2 obtained through demultiplexing by the optical demultiplexing section 3 and reflects the reference beam L2.

The beam path length adjustment section 80 is configured to change the beam path length for the reference beam L2 in order to adjust a position where tomographic image acquisition is started, and includes collimator lenses 81 and 82 and a reflecting mirror 83. The reference beam L2 from the circulator 5a passes through the collimator lenses 81 and 82, and then the reference beam L2 is reflected by the reflecting mirror 83. A return beam L2a of the reference beam L2 enters the circulator 5a again through the collimator lenses 81 and 82.

The reflecting mirror 83 is arranged on a movable stage 84. The movable stage 84 is provided to be capable of moving in a direction indicated by an arrow A by a mirror movement section 85. The beam path length for the reference beam L2 is changed when the movable stage 84 moves in the direction indicated by the arrow A. The return beam L2a of the reference beam L2 from the beam path length adjustment section 80 is guided to an optical multiplexing/demultiplexing section 4 through the circulator 5a.

Meanwhile, the measuring beam L1 obtained through the demultiplexing by the optical demultiplexing section 3 is guided to the probe 40 through a circulator 5b and an optical fiber FB. The measuring beam L1 is emitted from an exit end of the probe 40 and is applied to an object T to be measured. A return beam L3 of the measuring beam L1 enters the probe 40 again and returns to the circulator 5b.

The probe 40 guides the incident measuring beam L1 to the object T to be measured through an optical rotary connector section 41 and applies it to the object T to be measured. The probe 40 also guides the return beam L3 from the object T to be measured obtained when the measuring beam L1 is applied to the object T to be measured.

Let Z be the depth direction of the object T to be measured, X be the longitudinal axis direction of the probe, and Y be a direction perpendicular to a ZX plane. The probe 40 is configured in a manner that a fiber part extending from the optical rotary connector section 41 is rotated by a motor (not shown) in an optical scanning section 42 serving as a scanning device. A deflecting mirror is fixed to the distal end of the fiber part to be rotated together with the fiber part. With the configuration, the measuring beam L1 is scanned (radial scanning is performed) circumferentially over the object T to be measured. The radial scanning allows measurement of a two-dimensional tomographic image on a ZY plane. The motor (not shown) in the optical scanning section 42 causes the distal end of the probe 40 to perform backward and forward scanning in the direction X perpendicular to a plane formed by a scanning circle of the measuring beam L1. The backward and forward scanning allows measurement of an XYZ three-dimensional tomographic image. The probe 40 is detachably attached to the optical fiber FB with an optical connector (not shown).

Note that although not shown, according to this embodiment, for example, the probe 40 is insertable into a forceps channel or the like of an endoscope. The probe 40 is configured to be capable of inserting an insertion part of the endoscope into a body cavity and, while observing an endoscopic image, setting, as the object T to be measured, a tissue in the body cavity such as a mucosal tissue of the large intestine, the stomach, or the like or a cartilage tissue in the bronchus and performing OCT measurement on the object T to be measured by the probe 40 through the forceps channel.

Figure 2:
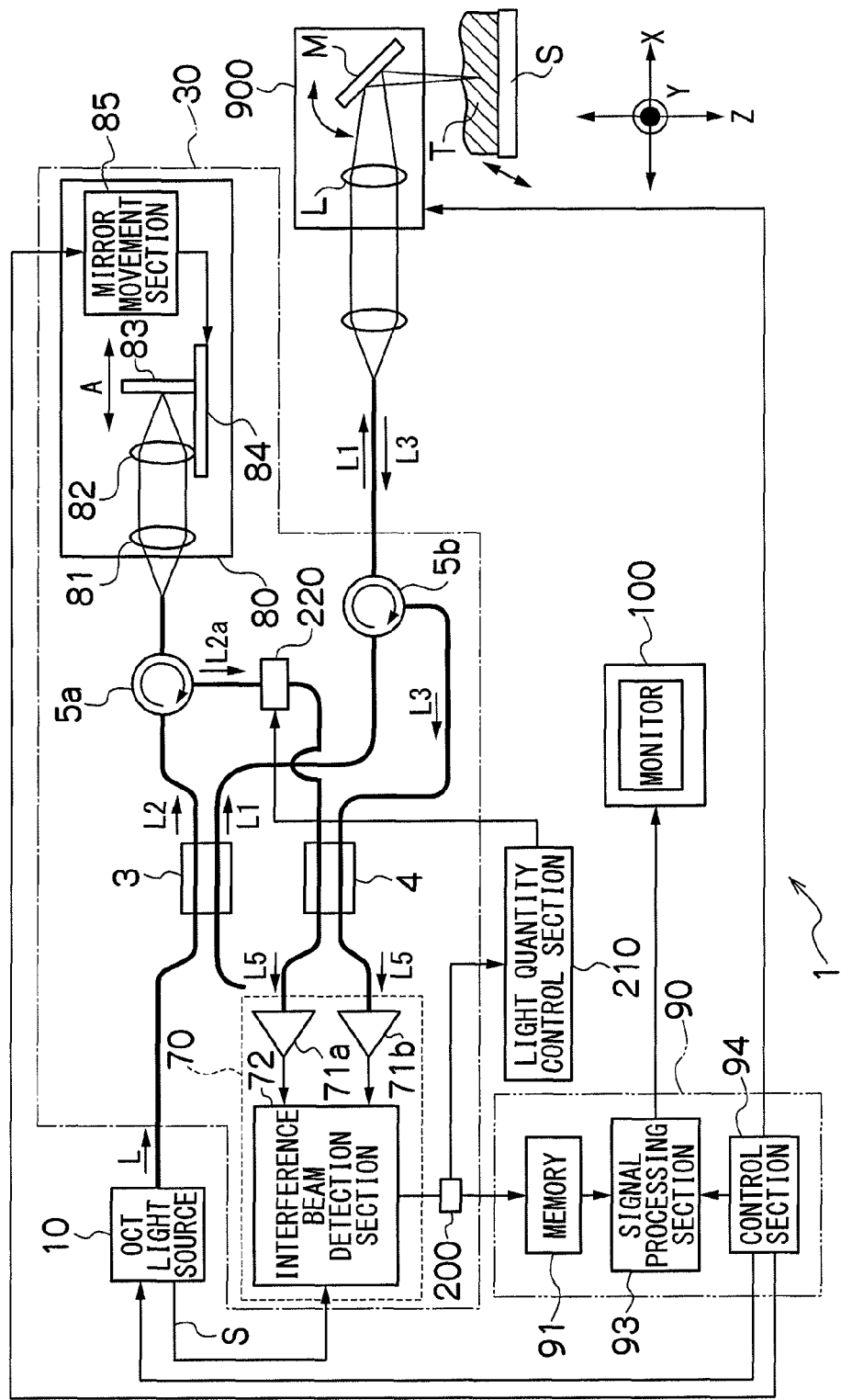
FIG. 2 is a diagram showing a modification (modified example) of a scanning device in the OCT measurement apparatus in FIG. 1.

FIG. 2 is a diagram showing a modification of the scanning device in the OCT measurement apparatus in FIG. 1.

The shape of the distal end of the probe and a scanning direction are, of course, not limited to those described above. For example, an optical transmission/reception section 900 in which a lens L and a fast scanning mirror M such as a galvano mirror are arranged may be provided on the fiber distal end side, as shown in FIG. 2. In this configuration, the measuring beam L1 is applied to the object T to be measured and scanned by the fast scanning mirror M in order to acquire optical tomographic structure information. Additionally, optical three-dimensional structure information may be acquired by backward and forward scanning of the object T to be measured using a stage S, in a direction almost orthogonal to a scanning direction of the fast scanning mirror M. Alternatively, the fast scanning mirror M may not be used, and the measuring beam may be scanned over the object T to be measured in a two-dimensional manner using the stage S. Alternatively, optical axis scanning mechanisms and measurement sample movement mechanisms as described above may be adopted in combination. Optical axis scanning in the OCT apparatus may be performed using the fast scanning mirror M (galvano mirror) or the stage S.

In the case of the probe 40, although not shown, the deflecting mirror may be provided inside the distal end of the probe 40, and radial scanning may be performed by rotating only the deflecting mirror by the motor, without rotation of the fiber part.

Scanning using the measuring beam L1 is not limited to radial scanning and linear scanning (so-called spiral scanning) For example, a MEMS (Micro Electro Mechanical Systems) mirror may be provided inside the distal end of the probe 40, and the measuring beam L1 may be linearly scanned in a two-dimensional manner using the MEMS mirror.

The reflected beam (or backscattered beam) L3 from the object T to be measured is guided to the OCT interferometer 30. In the OCT interferometer 30, the reflected beam L3 is guided to the optical multiplexing/demultiplexing section 4 through the circulator 5*b*. In the optical multiplexing/demultiplexing section 4, the reflected beam (or backscattered beam) L3 of the measuring beam L1 and the return beam L2*a* of the reference beam L2 are multiplexed and are emitted toward the interference information detection section 70.

The interference information detection section 70 is configured to detect, at a predetermined sampling frequency, an interference beam L5 generated from the reflected beam (or backscattered beam) L3 of the measuring beam L1 and the return beam L2*a* of the reference beam L2 multiplexed by the optical multiplexing/demultiplexing section 4. The interference information detection section 70 includes InGaAs photodetectors 71*a* and 71*b* which each measure the light intensity of a corresponding component of the interference beam L5 and an interference beam detection section 72 which performs balance detection on a detected value from the InGaAs photodetector 71*a* and a detected value from the InGaAs photodetector 71*b*. Note that the interference beam L5 is split into two beams by the optical multiplexing/demultiplexing section 4 and that the two beams are detected by the InGaAs photodetectors 71*a* and 71*b* and are outputted to the interference beam detection section 72. The interference beam detection section 72 performs a Fourier transform on the interference beam L5 in synchronism with a sweep trigger signal S of the OCT light source 10, thereby detecting the intensity of the reflected beam (or backscattered beam) L3 at each depth position of the object T to be measured.

The tomographic image generation section 90 stores the intensity of the reflected beam (or backscattered beam) L3 at each depth position of the object T to be measured detected by the interference beam detection section 72 as a piece of signal intensity information in interference information in a memory 91. In addition to the memory 91, the tomographic image generation section 90 includes a signal processing section 93 and a control section 94. The signal processing section 93 constructs tomographic images, each of which is a piece of structure information of the object T to be measured, on the basis of the pieces of signal intensity information in the interference information and generates an optical three-dimensional structure image from the tomographic images. The control section 94 controls the signal processing section 93, performs light emission control on the OCT light source 10, and controls the mirror movement section 85.

The OCT measurement apparatus 1 according to the present embodiment further includes a level detection section 200 serving as a return beam information detection device which detects the signal level of the piece of signal intensity information in interference information outputted from the interference beam detection section 72, a variable optical attenuator (hereinafter referred to as a VOA) 220 serving as a reference beam light quantity adjustment device which adjusts the light quantity of the return beam L2*a* of the reference beam L2, and a light quantity control section 210 which controls the VOA 220 on the basis of the signal level of the piece of signal intensity information in the interference information detected by the level detection section 200. In the case of FIGS. 1 and 2, an interference signal level control device is composed of the light quantity control section 210 and the VOA 220.

Figure 3:
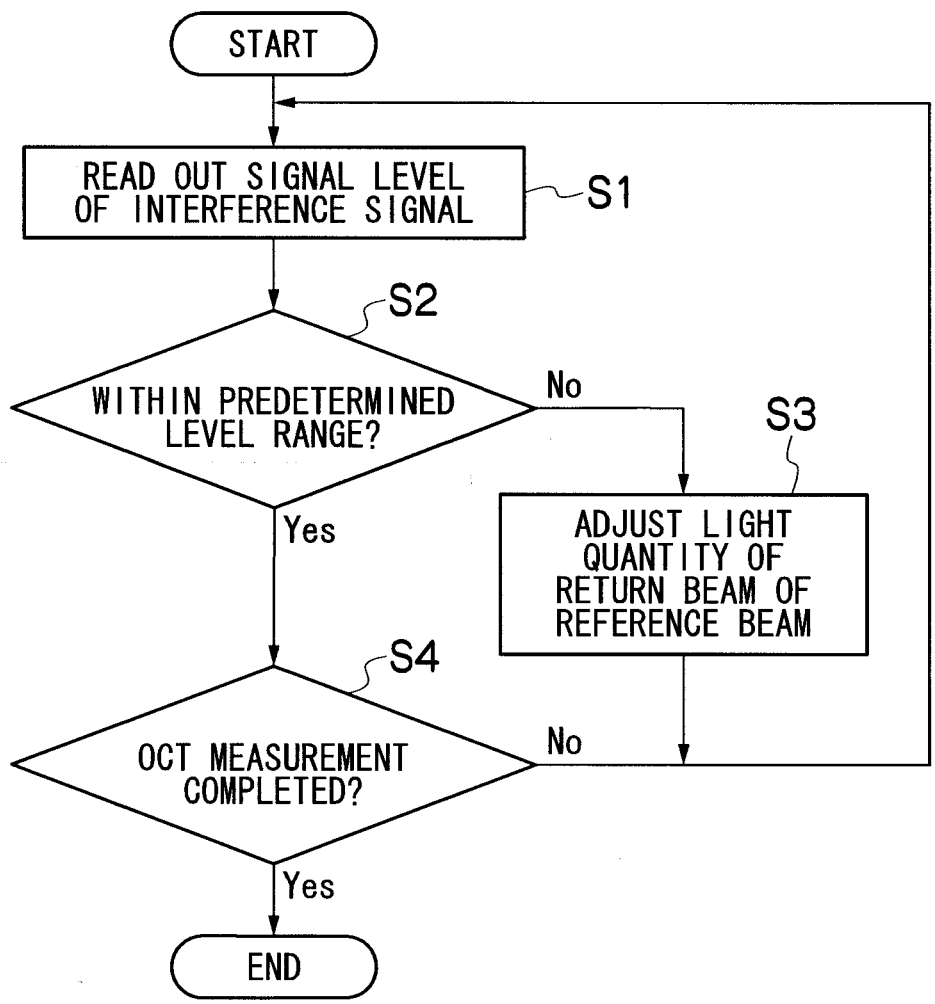
FIG. 3 is a flow chart for explaining the operation of a light quantity control section in FIG. 1.
Figure 4:
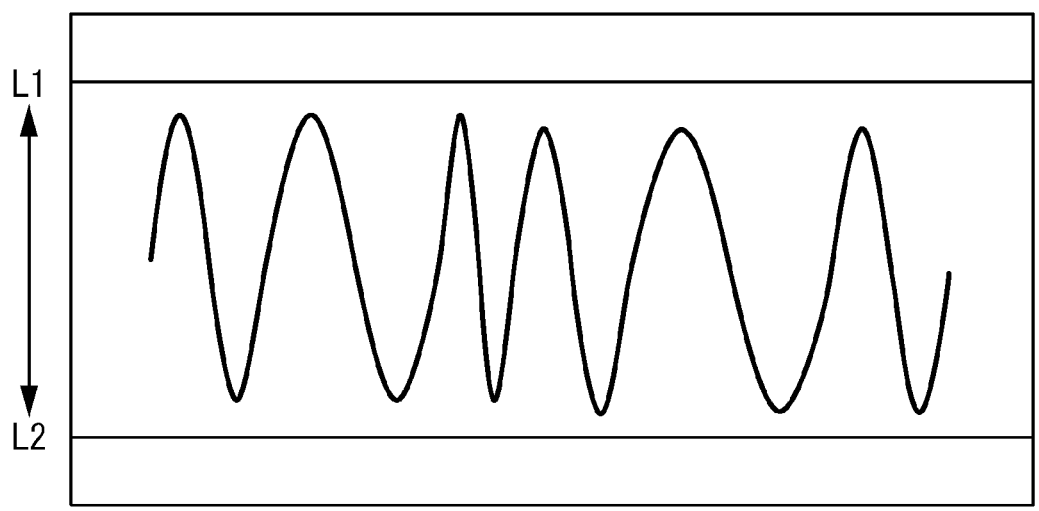
FIG. 4 is a first chart for explaining the flow chart in FIG. 3.
Figure 5:
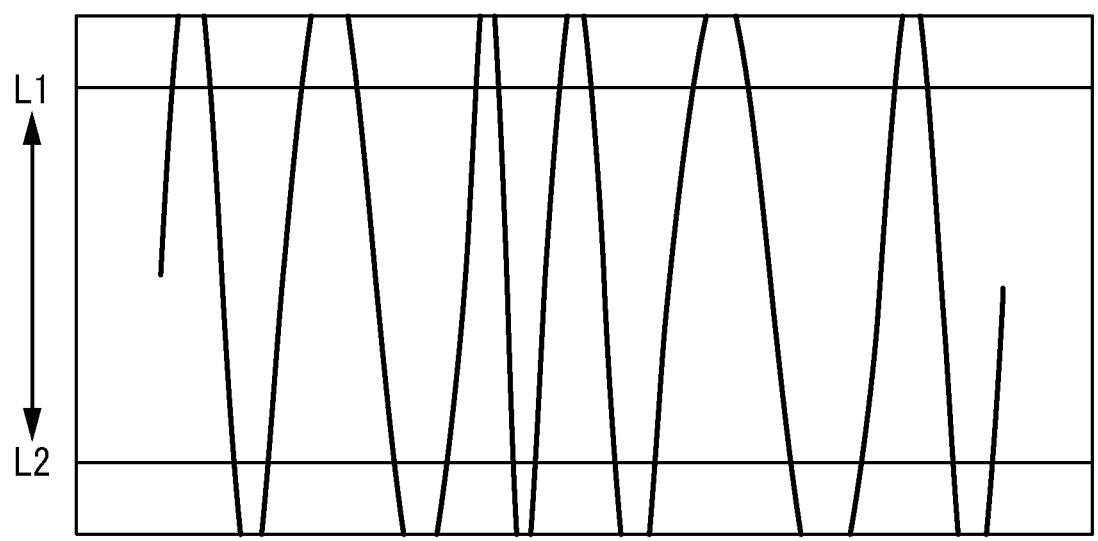
FIG. 5 is a second chart for explaining the flow chart in FIG. 3.
Figure 6:
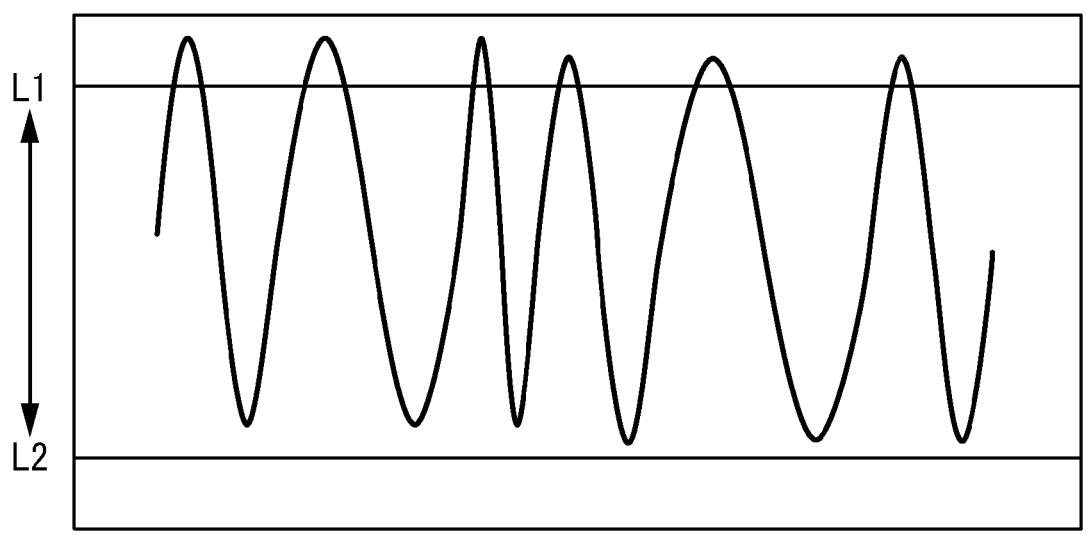
FIG. 6 is a third chart for explaining the flow chart in FIG. 3.

FIG. 3 is a flow chart for explaining the operation of the light quantity control section in FIG. 1. FIGS. 4 to 6 are charts for explaining the flow chart in FIG. 3.

As shown in FIG. 3, the light quantity control section 210 reads out, from the level detection section 200, the signal level of a piece of signal intensity information in interference information detected in the level detection section 200 (step S1).

The light quantity control section 210 determines whether the read-out signal level of the piece of signal intensity information in the interference information is (falls) within a dynamic range which allows appropriate processing in the signal processing section 93 (e.g., a predetermined signal level range of L1 to L2) (step S2). If the light quantity control section 210 determines that the signal level of the piece of signal intensity information in the interference information is within the predetermined signal level range of L1 to L2, as shown in FIG. 4, the flow shifts to step S4. On the other hand, as in, e.g., FIG. 5, if the signal level of the piece of signal intensity information in the interference information is saturated or if the signal level is not saturated but deviates from the predetermined signal level range of L1 to L2, the flow shifts to step S3.

If the light quantity control section 210 determines that the signal level of the piece of signal intensity information in the interference information deviates from the predetermined signal level range of L1 to L2, it controls the VOA 220 to attenuate the light quantity of the return beam L2a of the reference beam L2 by a predetermined quantity, and the flow returns to step S1 (step S3).

If the light quantity control section 210 determines that the signal level of the piece of signal intensity information in the interference information is within the predetermined signal level range of L1 to L2, it repeats the processes in steps S1 to S3 described above until OCT measurement ends (step S4).

As described above, in the OCT measurement apparatus 1 according to the present embodiment, the light quantity control section 210 reads out the signal level of a piece of signal intensity information in interference information detected in the level detection section 200, performs the processes in steps S1 to S3 such that the signal level of the piece of signal intensity information in the interference information is within the predetermined signal level range of L1 to L2, and controls the VOA 220. Accordingly, the signal level of each piece of signal intensity information in the interference information falls within the predetermined signal level range of L1 to L2. The signal processing section 93 performs a Fourier transform and the like on each piece of signal intensity information in the interference information having the unsaturated signal level within the dynamic range and generates optical structure information of the object T to be measured.

That is, the OCT measurement apparatus 1 according to the present embodiment can detect an interference signal at an appropriate level without saturating interference signals and reducing an S/N ratio and generate optical structure information of an object to be measured.

In the OCT measurement apparatus 1 according to the present embodiment, the return beam information detection device is composed of the level detection section 200, which detects the signal level of a piece of signal intensity information in interference information outputted from the interference beam detection section 72, and the interference signal level control device is composed of the light quantity control section 210 and the VOA 220, as shown in FIG. 1. The presently disclosed subject matter, however, is not limited to this. The return beam information detection device and the interference signal level control device may be configured, as in first to fifth modifications below.

<First Modification>

Figure 7:
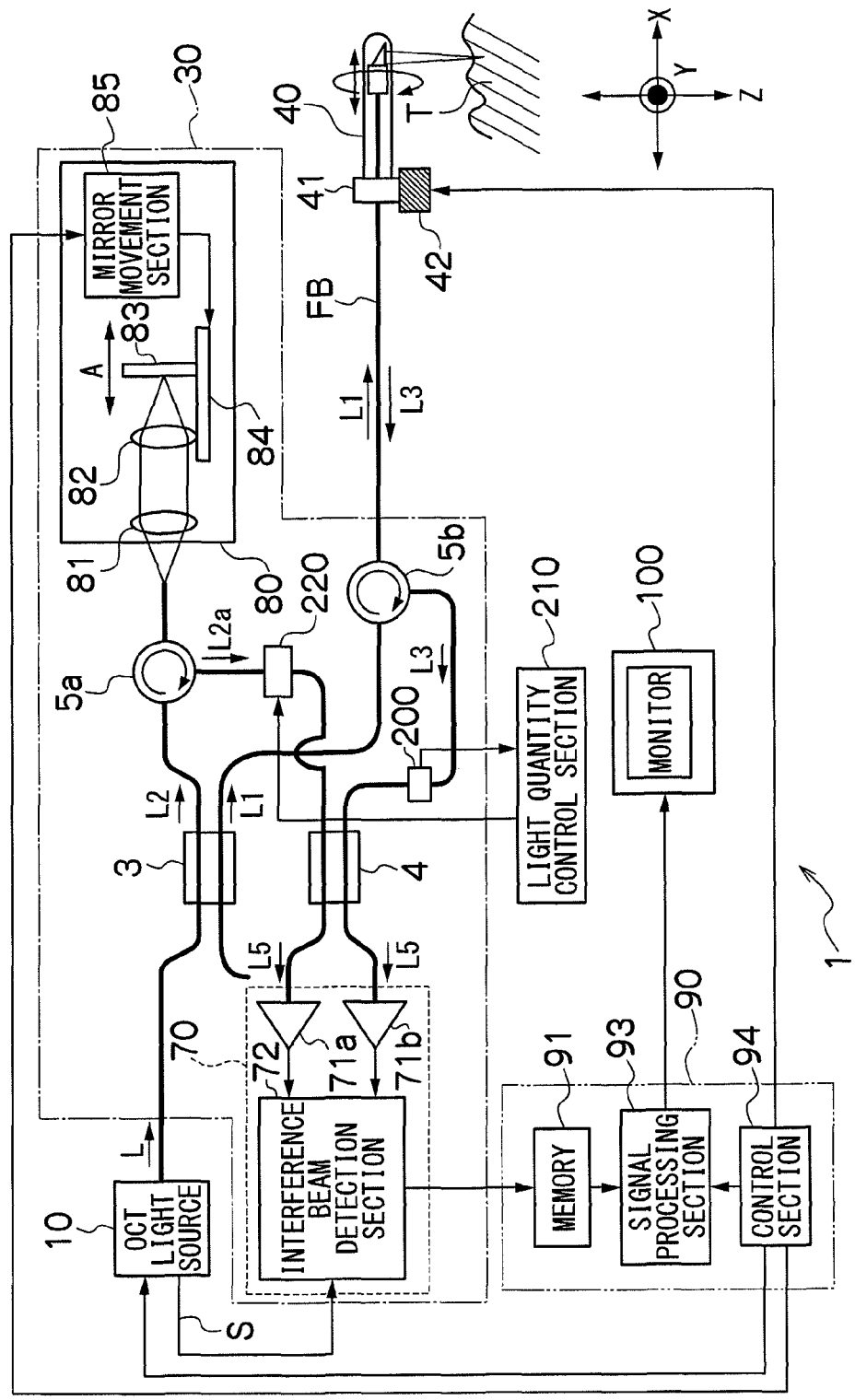
FIG. 7 is a block diagram showing the configuration of a first modification of the OCT measurement apparatus in FIG. 1.

FIG. 7 is a block diagram showing the configuration of the first modification of the OCT measurement apparatus in FIG. 1.

The first modification of the OCT measurement apparatus is shown in FIG. 7. A return beam information detection device may be composed of, e.g., the level detection section 200, which detects, as return beam information, the light quantity level of a reflected beam (or backscattered beam) L3 guided from the circulator 5b to the optical multiplexing/demultiplexing section 4. An interference signal level control device may be composed of the light quantity control section 210 and the VOA 220 serving as a reference beam light quantity adjustment device which adjusts the light quantity of a return beam L2a of a reference beam L2 by a predetermined quantity, as in the present embodiment described above.

According to the configuration of the first modification, in the flow chart described with reference to FIG. 3, the light quantity control section 210 reads out the light quantity level of the reflected beam (or backscattered beam) L3 detected by the level detection section 200 in step S1. In step S2, the light quantity control section 210 determines whether the read-out light quantity level of the reflected beam (or backscattered beam) L3 from the level detection section 200 is (falls) within a dynamic range which allows appropriate processing in the signal processing section 93 (e.g., a predetermined light quantity level range). If the light quantity control section 210 determines that the light quantity level of the reflected beam (or backscattered beam) L3 deviates from the predetermined light quantity level range, it controls the VOA 220 to attenuate the light quantity of the return beam L2a of the reference beam L2 by the predetermined quantity in step S3, and the flow returns to step S1.

<Second Modification>

Figure 8:
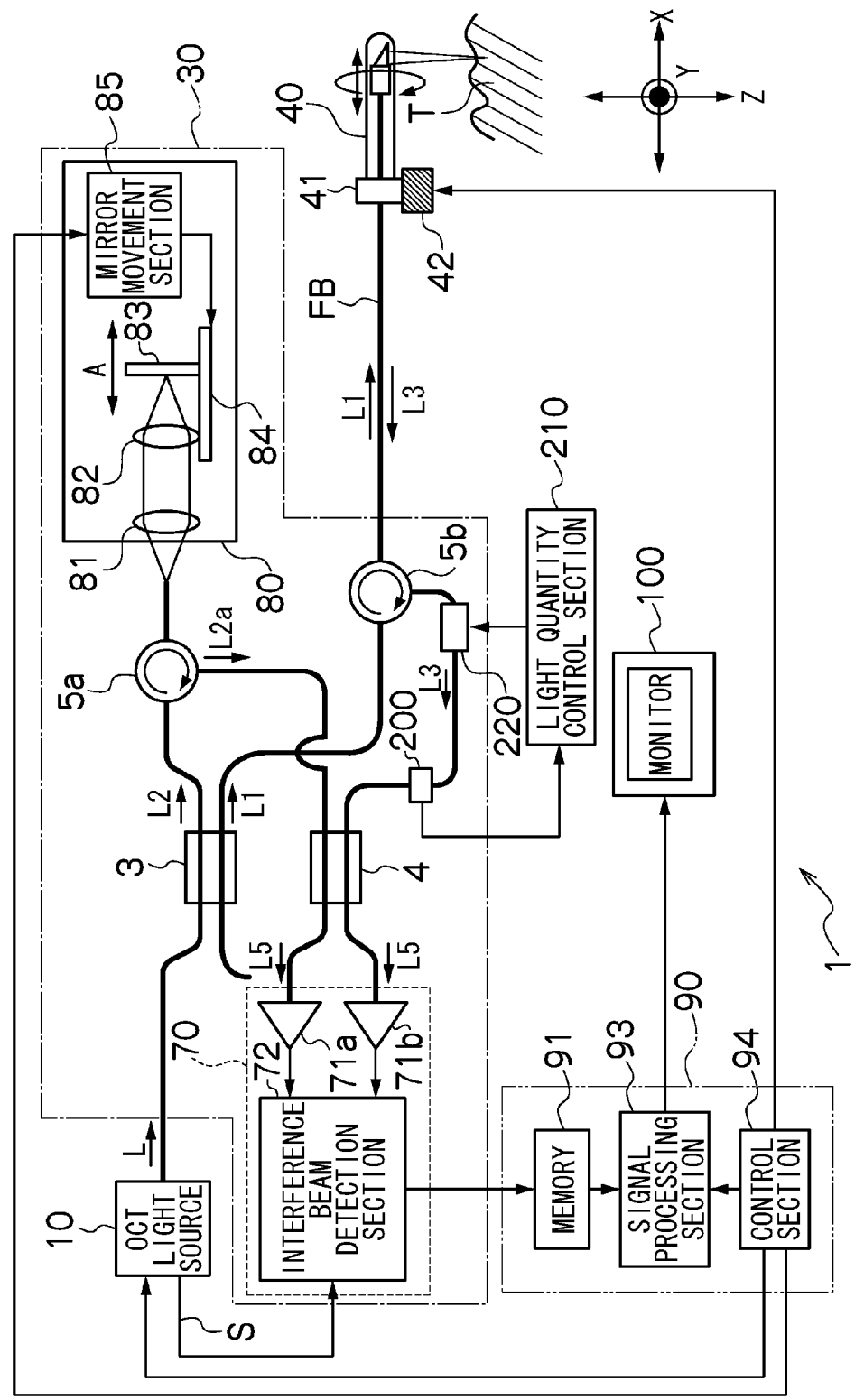
FIG. 8 is a block diagram showing the configuration of a second modification of the OCT measurement apparatus in FIG. 1.

FIG. 8 is a block diagram showing the configuration of the second modification of the OCT measurement apparatus in FIG. 1.

The second modification of the OCT measurement apparatus is shown in FIG. 8. A return beam information detection device may be composed of, e.g., the level detection section 200, which detects, as return beam information, the light quantity level of a reflected beam (or backscattered beam) L3 guided from the circulator 5b to the optical multiplexing/demultiplexing section 4. An interference signal level control device may be composed of the light quantity control section 210 and the VOA 220 serving as a return beam light quantity adjustment device which attenuates the light quantity of the reflected beam (or backscattered beam) L3 by a predetermined quantity.

According to the configuration of the second modification, in the flow chart described with reference to FIG. 3, the light quantity control section 210 reads out the light quantity level of the reflected beam (or backscattered beam) L3 detected by the level detection section 200 in step S1. In step S2, the light quantity control section 210 determines whether the read-out light quantity level of the reflected beam (or backscattered beam) L3 from the level detection section 200 is (falls) within a dynamic range which allows appropriate processing in the signal processing section 93 (e.g., a predetermined light quantity level range). If the light quantity control section 210 determines that the light quantity level of the reflected beam (or backscattered beam) L3 deviates from the predetermined light quantity level range, it controls the VOA 220 to attenuate the light quantity of the reflected beam (or backscattered beam) L3 by the predetermined quantity in step S3, and the flow returns to step S1.

<Third Modification>

Figure 9:
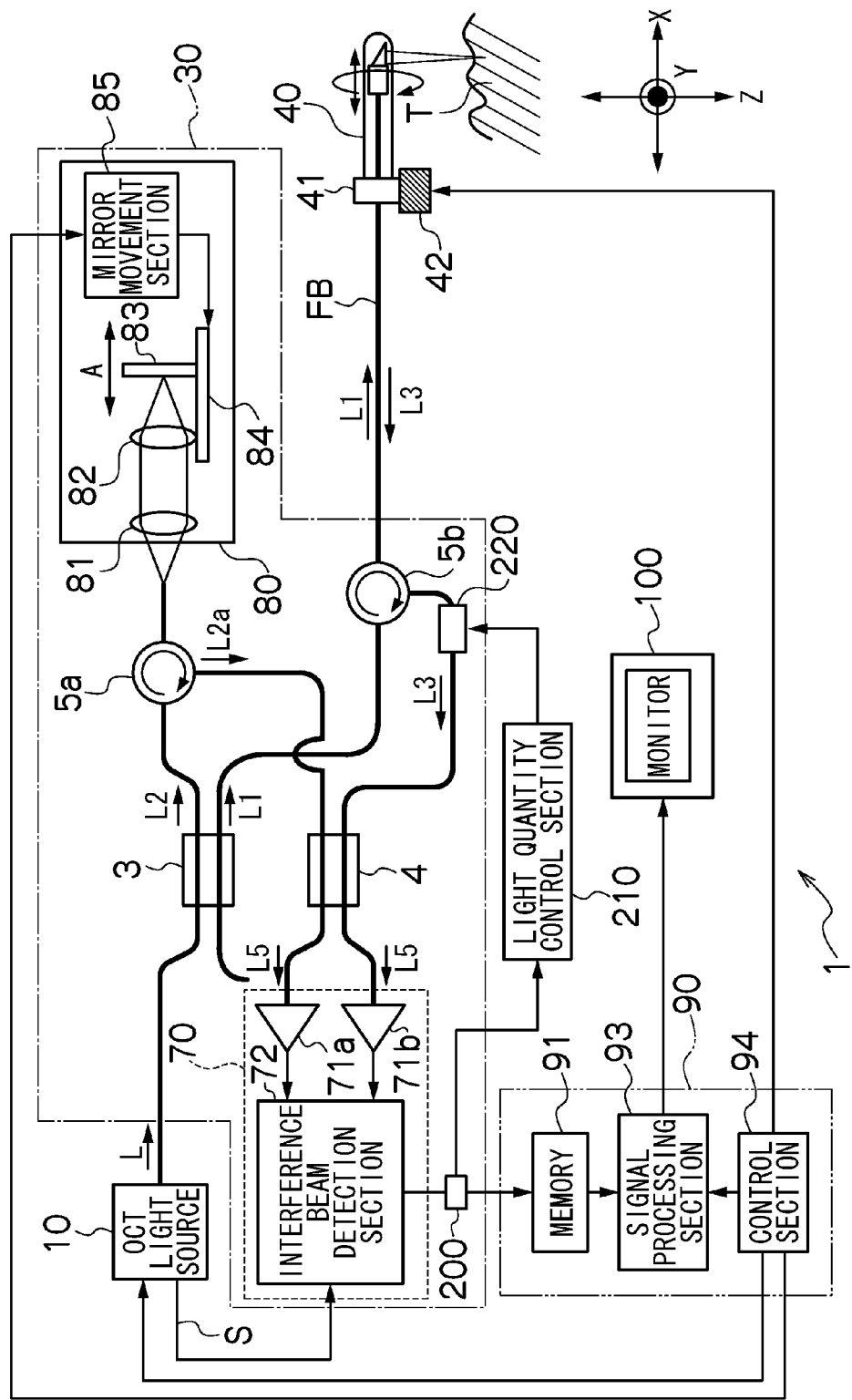
FIG. 9 is a block diagram showing the configuration of a third modification of the OCT measurement apparatus in FIG. 1.

FIG. 9 is a block diagram showing the configuration of the third modification of the OCT measurement apparatus in FIG. 1.

The third modification of the OCT measurement apparatus is shown in FIG. 9. A return beam information detection device may be composed of the level detection section 200, which detects the signal level of a piece of signal intensity information in interference information outputted from the interference beam detection section 72, as in the present embodiment described above. An interference signal level control device may be composed of the light quantity control section 210 and the VOA 220 serving as a return beam light quantity adjustment device which attenuates the light quantity of a reflected beam (or backscattered beam) L3 by a predetermined quantity.

According to the configuration of the third modification, in the flow chart described with reference to FIG. 3, the light quantity control section 210 reads out the signal level of a piece of signal intensity information in interference information detected by the level detection section 200 in step S1. In step S2, the light quantity control section 210 determines whether the signal level of the piece of signal intensity information in the interference information read out from the level detection section 200 is (falls) within a dynamic range which allows appropriate processing in the signal processing section 93 (e.g., a predetermined signal level range of L1 to L2). If the light quantity control section 210 determines that the signal level of the piece of signal intensity information in the interference information deviates from the predetermined signal level range of L1 to L2, it controls the VOA 220 to attenuate the light quantity of the reflected beam (or backscattered beam) L3 by the predetermined quantity in step S3, and the flow returns to step S1.

<Fourth Modification>

Figure 10:
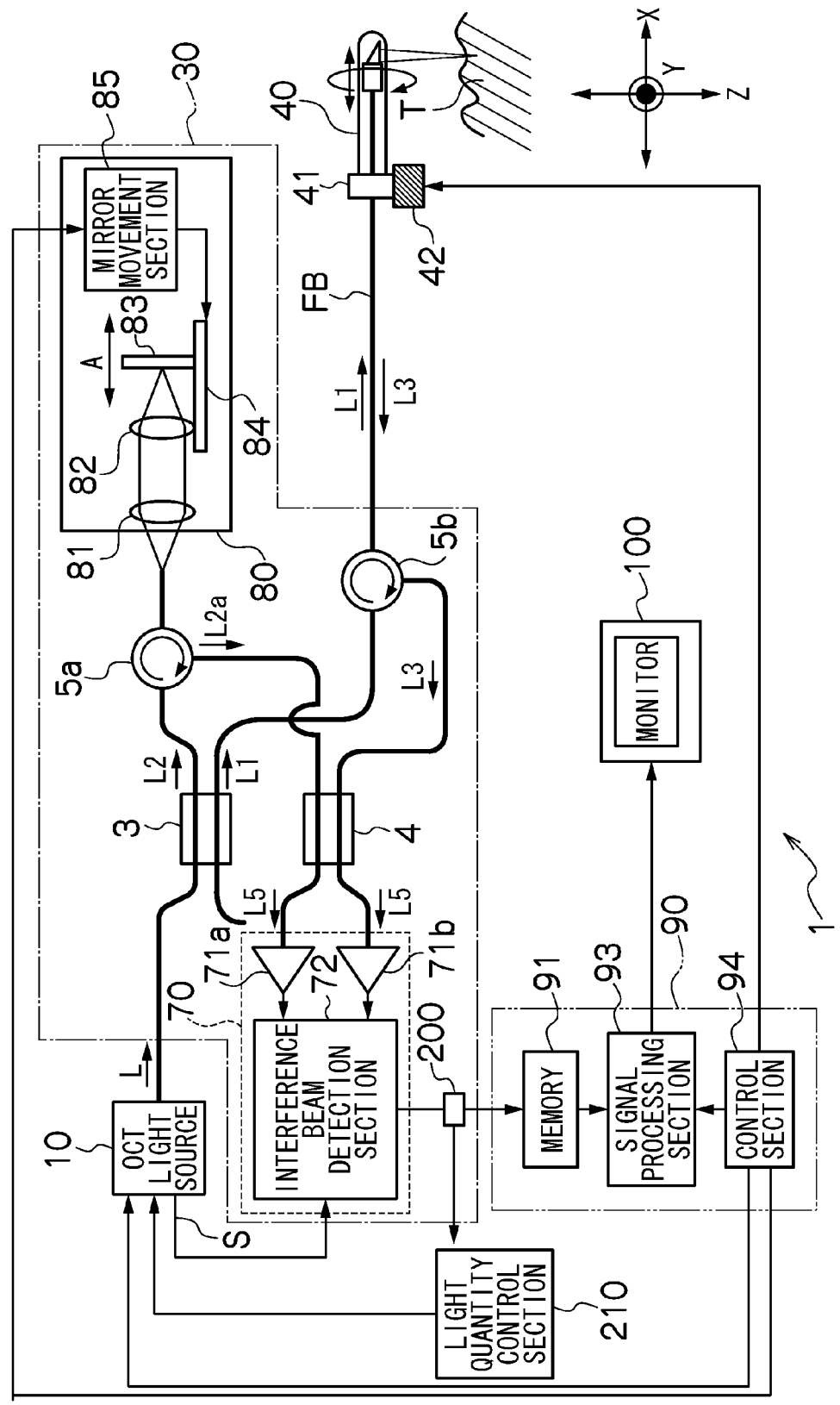
FIG. 10 is a block diagram showing the configuration of a fourth modification of the OCT measurement apparatus in FIG. 1.

FIG. 10 is a block diagram showing the configuration of the fourth modification of the OCT measurement apparatus in FIG. 1.

The fourth modification of the OCT measurement apparatus is shown in FIG. 10. A return beam information detection device may be composed of the level detection section 200, which detects the signal level of a piece of signal intensity information in interference information outputted from the interference beam detection section 72, as in the present embodiment described above. An interference signal level control device may be composed of the light quantity control section 210 so that the light quantity control section 210 may control the OCT light source 10. In the case of the fourth modification, the light quantity control section 210 constitutes the interference signal level control device and also constitutes a low interference beam light quantity adjustment device which adjusts the light quantity of a low interference beam from the OCT light source 10.

According to the configuration of the fourth modification, in the flow chart described with reference to FIG. 3, the light quantity control section 210 reads out the signal level of a piece of signal intensity information in interference information detected by the level detection section 200 in step S1. In step S2, the light quantity control section 210 determines whether the signal level of the piece of signal intensity information in the interference information read out from the level detection section 200 is (falls) within a dynamic range which allows appropriate processing in the signal processing section 93 (e.g., a predetermined signal level range of L1 to L2). If the light quantity control section 210 determines that the signal level of the piece of signal intensity information in the interference information deviates from the predetermined signal level range of L1 to L2, it controls the VOA 220 to attenuate the light quantity of a low interference beam from the OCT light source 10 by the predetermined quantity in step S3, and the flow returns to step S1.

<Fifth Modification>

Figure 11:
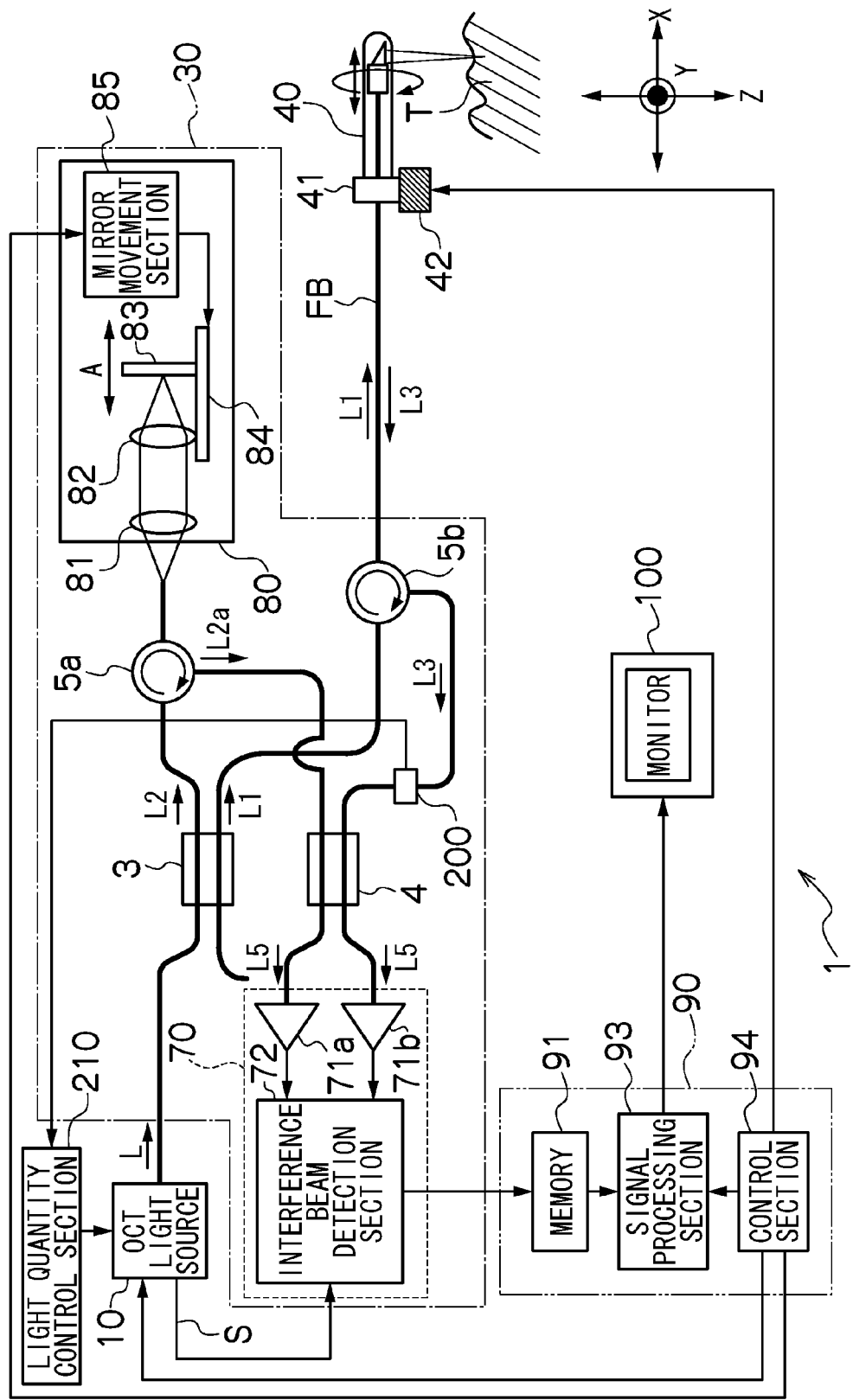
FIG. 11 is a block diagram showing the configuration of a fifth modification of the OCT measurement apparatus in FIG. 1.

FIG. 11 is a block diagram showing the configuration of the fifth modification of the OCT measurement apparatus in FIG. 1.

The fifth modification of the OCT measurement apparatus is shown in FIG. 11. A return beam information detection device may be composed of the level detection section 200, which detects, as return beam information, the light quantity level of a reflected beam (or backscattered beam) L3 guided from the circulator 5b to the optical multiplexing/demultiplexing section 4. An interference signal level control device may be composed of the light quantity control section 210. In this configuration, the light quantity control section 210 may control the OCT light source 10. In the case of the fifth modification, the light quantity control section 210 constitutes the interference signal level control device and also constitutes a low interference beam light quantity adjustment device which adjusts the light quantity of a low interference beam from the OCT light source 10.

According to the configuration of the fifth modification, in the flow chart described with reference to FIG. 3, the light quantity control section 210 reads out the light quantity level of a reflected beam (or backscattered beam) L3 detected by the level detection section 200 in step S1. In step S2, the light quantity control section 210 determines whether the light quantity level of the reflected beam (or backscattered beam) L3 read out from the level detection section 200 is (falls) within a dynamic range which allows appropriate processing in the signal processing section 93 (e.g., a predetermined light quantity level range). If the light quantity control section 210 determines that the light quantity level of the reflected beam (or backscattered beam) L3 deviates from the predetermined light quantity level range, it controls the VOA 220 to attenuate the light quantity of a low interference beam from the OCT light source 10 by a predetermined quantity in step S3, and the flow returns to step S1.

Note that although the light quantity control section 210 has been described as determining in step S2 (see FIG. 3) whether the signal level of a piece of signal intensity information in interference information read out from the level detection section 200 is (falls) within the dynamic range which allows appropriate processing in the signal processing section 93 (e.g., the predetermined signal level range of L1 to L2), the presently disclosed subject matter is not limited to this. For example, a predetermined upper limit value for a signal level may be set, and the light quantity control section 210 may determine in step S2 whether the signal level of a piece of signal intensity information in interference information read out from the level detection section 200 is larger than the upper limit value and perform the processes in steps S3 and S4 on the basis of the determination result.

Note that, in the present embodiment, the light quantity control section 210 can include an optical information comparison device which compares the return beam information detected by the level detection section 200 (e.g., the return beam information detection device) with predetermined reference beam information. In this configuration, the signal level of an interference signal can be controlled to be within a predetermined level range by adjusting the light quantity of a reference beam or a return beam by the VOA 220 (one of the reference beam light quantity adjustment device and the return beam light quantity adjustment device) on the basis of a comparison result from the optical information comparison device to bring the ratio between the light quantity of the reference beam and that of the return beam close to almost 1:1.

The predetermined reference beam information here may be a value measured by a light-receiving element for reference beam light quantity measurement. Alternatively, the predetermined reference beam information may be light quantity data (table) because the maximum light quantity is a constant independent of a test object. Bringing the ratio between the light quantity of the reference beam and that of the return beam close to almost 1:1 is the operation for making the ratio when through the VOA 220 closer to 1:1 than that when not-though the VOA 220, and the ratio need not be set to exactly 1:1. This makes it possible to achieve high contrast in an interference signal.

An optical structure information generation apparatus according to the presently disclosed subject matter has been described in detail above. The presently disclosed subject matter, however, is not limited to the above-described examples. Of course, various changes and modifications may be made without departing from the scope of the presently disclosed subject matter.

What is claimed is:

1. An OCT (Optical Coherence Tomography) apparatus, comprising:

a demultiplexing device which demultiplexes a low interference beam into a measuring beam and a reference beam;
an irradiation device which applies the measuring beam to an object to be measured in a depth direction;
a detecting device which detects an interference signal generated from a return beam of the measuring beam from the object to be measured and the reference beam;
a structure information generation device which generates optical structure information of the object to be measured on the basis of the interference signal;
a return beam information detection device which detects return beam information on the return beam; and
an interference signal level control device which controls a signal level of the interference signal to be within a predetermined level range on the basis of the return beam information.

2. The OCT apparatus according to claim 1, wherein the return beam information detection device detects a light quantity level of the return beam as the return beam information.

3. The OCT apparatus according to claim 1, wherein the return beam information detection device detects the signal level of the interference signal as the return beam information.

4. The OCT apparatus according to claim 1, wherein:
the interference signal level control device includes a reference beam light quantity adjustment device which adjusts a light quantity of the reference beam; and
the interference signal level control device controls the signal level of the interference signal to be within the predetermined level range by adjusting the light quantity of the reference beam on the basis of the return beam information.

5. The OCT apparatus according to claim 1, wherein
the interference signal level control device includes:
a reference beam light quantity adjustment device which adjusts a light quantity of the reference beam;
a return beam light quantity adjustment device which adjusts a light quantity of the return beam; and
an optical information comparison device which compares the return beam information detected by the return beam information detection device with predetermined reference beam information, and
the interference signal level control device brings a light quantity ratio between the reference beam and the return beam close to almost 1:1 by adjusting the light quantity of one of the reference beam and the return beam, on the basis of a comparison result from the optical information comparison device using one of the reference beam light quantity adjustment device and the return beam light quantity adjustment device, and controls the signal level of the interference signal to be within the predetermined level range.

6. The OCT apparatus according to claim 5, wherein:
the predetermined reference beam information includes a predetermined light quantity of the reference beam;
the return beam information detected by the return beam information detection device includes the light quantity of the return beam; and the interference signal level control device compares the light quantity of the return beam with the predetermined light quantity of the reference beam, attenuates one of the reference beam and the return beam, the one which has larger light quantity, using one of the reference beam light quantity adjustment device and the return beam light quantity adjustment device, and brings a light quantity ratio between the reference beam and the return beam close to almost 1:1.

7. The OCT apparatus according to claim 1, wherein:
the interference signal level control device comprises a return beam light quantity adjustment device which adjusts a light quantity of the return beam; and
the interference signal level control device controls the signal level of the interference signal to be within the predetermined level range by adjusting the light quantity of the return beam on the basis of the return beam information.

8. The OCT apparatus according to claim 1, wherein:
the interference signal level control device comprises a low interference beam light quantity adjustment device which adjusts a light quantity of the low interference beam; and
the interference signal level control device controls the signal level of the interference signal to be within the predetermined level range by adjusting the light quantity of the low interference beam on the basis of the return beam information.

9. The OCT apparatus according to claim 1, further comprising:
a measuring beam scanning device which scans the measuring beam along a scan plane which includes a depth direction of the object to be measured; and
an optical structure tomographic image construction device which constructs an optical structure tomographic image of the object to be measured from the optical structure information.

10. The OCT apparatus according to claim 9, further comprising:
a scan plane scanning device which scans the scan plane in a direction almost orthogonal to the scan plane; and
an optical three-dimensional structure image construction device which constructs an optical three-dimensional structure image of the object to be measured from the optical structure information.

11. An interference signal level control method for an OCT apparatus, comprising the steps of:
demultiplexing a low interference beam into a measuring beam and a reference beam;
applying the measuring beam to an object to be measured in a depth direction;
detecting an interference signal generated from a return beam of the measuring beam from the object to be measured and the reference beam;
generating optical structure information of the object to be measured on the basis of the interference signal;
detecting return beam information on the return beam; and
controlling a signal level of the interference signal to be within a predetermined level range on the basis of the return beam information.

* * * * *